United States Patent Office 3,681,216
Patented Aug. 1, 1972

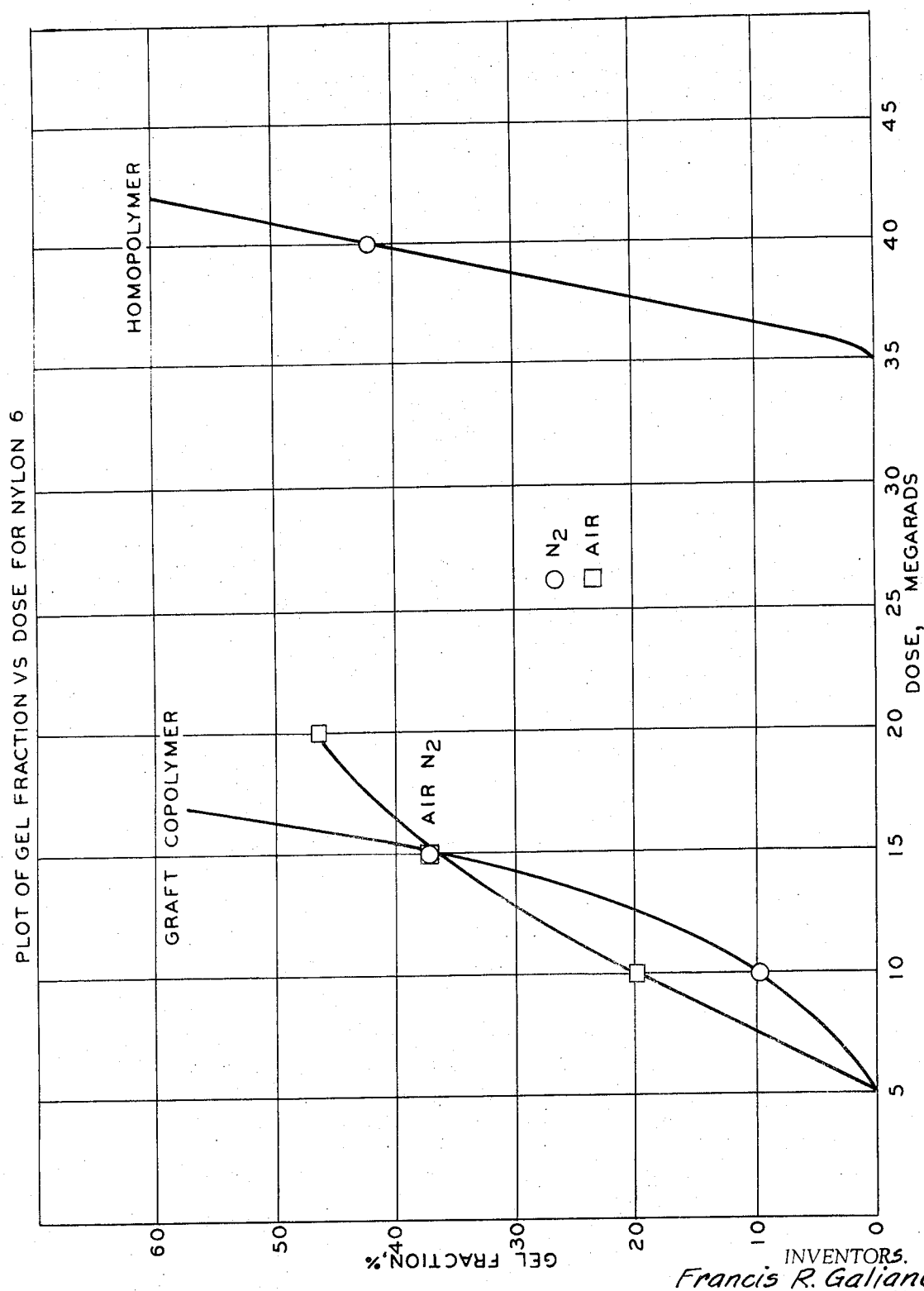

1

3,681,216
CROSSLINKED NYLON BY IRRADIATION OF A GRAFT COPOLYMER OF NYLON WITH AN ETHYLENE/ACRYLATE OR MODIFIED COPOLYMER
Francis R. Galiano, Prairie Village, and Samuel P. Thackaberry, Wayne E. Smith, and Raymond P. Anderson, Overland Park, Kans., assignors to Custom Resins, Inc., Henderson, Ky.
Filed June 13, 1969, Ser. No. 832,910
Int. Cl. B01j 1/00; C08d 1/00
U.S. Cl. 204—159.14    11 Claims

ABSTRACT OF THE DISCLOSURE

The nylon articles such as films and fibers, are effectively cross-linked by irradiation to obtain dimensional stability, memory and resistance to heat and solvents without significant polymer degradation by employing a graft of a nylon polymer grown on an ethylene-acrylate copolymer as initiator and restricting the dose of ionizing radiation to a low dose of about 5 to 20 megarads. Higher doses give a highly cross-linked polymer with significantly lower degradation than with nylon homopolymers. The preferred ethylene copolymer has a portion of the acrylate converted to amide.

BACKGROUND OF THE INVENTION

This invention relates to a method of improving nylon by grafting the nylon to a polyethylene copolymer then crosslinking with ionizing radiation.

Crosslinking of nylon homopolymer is known in U.S. 2,858,259. The graft copolyymer of nylon onto ethylene-acrylate copolymer is known in U.S. 3,388,186. The ethylene-acrylate copolymer with acrylate partially converted to amide groups is known in U.S. 3,337,517. Radiation of polyethylene homopolymers blended with nylon is known in the Belgian Pat. No. 564,824.

However, the teachings of the prior art have not yet solved the problem of economically crosslinking nylon. A major drawback to commercialization of ionizing radiation-crosslinked nylon has been the cost of power required in such processes. It has been necessary to use dose levels above 30 megarads to obtain significantly high degrees of crosslinking (Majury & Pinner, Irradiation of Polycaprolactam, J. Appl. Chem., 8, p. 168, March 1958). However, this highly crosslinked material will become embrittled from the high radiation doses due to polymer degradation (ibid., p. 169).

SUMMARY OF THE INVENTION

Use of a polyolefin copolymer as initiator for caprolactam polymerization provides a means of preparing nylon 6 which can be highly crosslinked at radiation dose levels significantly lower than those required to crosslink nylon 6 homopolymers. See the accompanying drawing. The graft copolymer of nylon 6 prepared by this method crosslinks at about 5 megarads, while nylon 6 homopolymer crosslinks at about 35 megarads. Thus, irradiation of nylon 6 grafted to polyolefin copolymer is an economical process for the production of nylon 6 with decreased solubility, decreased plastic flow above 250° C., and higher heat resistance at elevated temperatures.

Controlled ionizing radiation of ethylene copolymer-initiated nylon at doses below 10 megarads provides an economical means for preparing high viscosity resin which is difficult to obtain by conventional methods, and for tailoring solution viscosity and other resin properties to a desired level. Thus, the graft copolymers of this invention can be crosslinked at doses which have been found economically feasible on other polymers.

Also, by means of this invention, the graft copolymer of nylon on a polyolefin copolymer, such as an ethylene-acrylate copolymer, is not degraded nearly as much as the similar nylon homopolymers at doses as high as 50 megarads. Thus, the graft copolymer of nylon on polyolefin copolymers can be highly crosslinked with significantly lower degradation than nylon homopolymers. However, at the present time it appears economically feasible to use a dose of 5 to 35, preferably 5 to 20 megarads, to keep costs lower due to electric power requirements.

The ethylene copolymer can have almost any molecular weight. Acrylate copolymers and methacrylate copolymers which have been converted mainly to the amide form, but may contain some acid, ester and salt groups are preferred. Some acid groups should be present initially or formed in-situ.

This process may be extended to include the radiation crosslinking of nylon 6 prepared with a variety of polyolefin copolymer initiators. Among the polyolefin copolymers which may be useful in this process are styrene-maleic anhydride (SMA) copolymers and their hydrolyzed and ammoniated analogs. Poly-α-olefin maleic anhydride (Polymac) copolymers and their hydrolyzed and ammoniated analogs, and ethylene-acrylic acid copolymers are also useful. This graft copolymer may also be crosslinked by other means such as conventional peroxide free radical agents.

This ionizing radiation of nylon 6-ethylene copolymer graft copolymer can be used to impart memory to film or fiber made of such graft copolymer. For example, film could be prepared, crosslinked by radiation, cold drawn, then shrunk around a material to be packaged with the use of heat. The shrinking would be the result of the memory imparted to the film by the radiation process. Another use, not economically or technically feasible by the prior art methods, would be to impart this same kind of memory to fibers of this graft copolymer by radiating the fibers in a finished piece of wearing apparel so that it would have memory to retain its original shape, i.e., another type of wash and wear fabric.

By "ionizing radiation" is meant radiation with sufficient energy to remove an electron from a gas atom, forming an ion pair; this requires an energy of about 32 electron volts (ev.) for each ion pair formed. This radiation has sufficient energy to non-selectively break chemical bonds; thus, in round numbers radiation with energy of 50 electron volts (ev.) and above is effective for the process of this invention. The ionizing radiation of the process of this invention is generally classed in two types: high energy particle radiation, and ionizing electromagnetic radiation. The effect produced by these two types of radiation is similar, the essential requisite being that the incident particles or photons have sufficient energy to break chemical bonds and generate free radicals.

The method and crosslinked graft copolymer of this invention can be achieved by irradiating with ionizing radiation at a dosage of about 5 to about 20 megarads. By nylon is meant any polycarbonamide forming polymers such as the monoaminocarboxylic acids or their corresponding lactams, or mixtures of diamines and dicarboxylic acid. By nylon 6 is meant polymerized caprolactam. The preformed copolymer which the nylon is grafted onto is a copolymer of ethylene containing from about 5 to about 90% by weight of chemically combined ethylene. The graft copolymer may contain from about 1 to about 30% by weight of preformed copolymer, and preferably about 2 to about 20% by weight of preformed copolymer.

The preformed copolymer is a copolymer of ethylene copolymerized with a monomer having the structural formula when polymerized

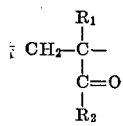

where $R_1$ is —H or —$CH_3$, $R_2$ is —$OR_3$, —OH, —$NH_2$, —$NHR_3$, and —$NR_3R_4$ or —OM, where M is a metal or —$NH_4$, $R_3$ and $R_4$ are lower alkyl groups, and lower alkyl means alkyl groups containing one to eight carbon atoms. Preferably the preformed copolymer contains at least 2% by weight of the polymerized monomer units in the copolymer where $R_2$ is —$NH_2$, —$NHR_3$ or —$NR_3R_4$.

DESCRIPTION OF THE DRAWING

The drawing is a graph, showing percent gel vs. dose. The graft copolymer of this invention is shown in the curves on the left. The homopolymer curve on the right is taken from the Majury & Pinner publication cited in the background above.

PREFERRED EMBODIMENTS

Preparation of ethylene-methyl acrylate copolymer

After preliminary lighting the reactor using an ethylene feed and attaining reactor equilibrium, the desired reaction is commenced by gradually adverting to the required reaction feed. The reactants are continuously fed by pumping into the fore part of reaction zone of a high pressure, agitated autoclave reactor at a ratio of 0.0067 mol of methyl acrylate per mol of ethylene and at a rate of about 500 lb./hr./cu. ft. of reactor volume. The reaction feed employed has low moisture and oxygen contents. Lauroyl peroxide is injected as the free radical initiator in an equivolume benzene mineral oil vehicle at a rate of 750 p.p.m. on the basis of the weight of feed. The reaction is conducted at a pressure of about 17,500 p.s.i. The temperature is maintained in the range of 300° F. to about 430° F., for the most part controlled at around 360° F. The reactor is equipped with a longitudinal agitator which is rotated at a rate of about 250 r.p.m.

The unconsumed reactants, along with the formed copolymer, are discharged from the reactor in a conversion to the copolymer of from 15 to 20% of the total weight of the reactants. Nearly all of the unpolymerised discharge of reactants constitutes ethylene. It is recovered from the molten copolymer by means of separator vessels and circulated for re-use.

The separated molten polymer is then extruded as a ribbon into a water bath for cooling. The solidified copolymer of ethylene and methyl acrylate is severed into cubes for convenient end use.

The copolymer has the following properties: a content of 0.054 mol of methyl acrylate/mol of ethylene of the polymer as determined by infrared absorption analysis, a melt index of 1.72, a density of 0.9365, and a Vicat softening point of 71° C.

Additionally, the copolymer has an ultimate elongation value of 690 percent. The copolymer shows an impact value of 2560 p.s.i., a yield point of 492 p.s.i., and an ultimate tensile strength of 1380 p.s.i. Film cast of the copolymer is highly elastomeric.

EXAMPLE I

A quantity of 300 grams of the above described copolymer having a crystallinity of about 50.4%, is added to a 2-liter autoclave ammonolysis chamber along with 300 mls. of concentrated ammonium hydroxide (15 N) and 600 mls. of xylene. The mixture is heated with constant agitation at about 225° C. for about 12 hours. Upon completion of the reaction, the residue comprising the amide derivative of the polymer is removed, washed with a methanol acetone mixture and is air dried. The dried amide polymer is ground, and a portion of the ground polymer is pressed into film. The pressed film has a crystallinity of 28% and is a relatively stiff and very tough film of high clarity.

EXAMPLE II

A 250 g. quantity of an ethylenemethyl acrylate copolymer containing 0.054 mole of methyl acrylate per mole of ethylene groups is employed (the copolymer of Example I of British Pat. 900,969). The starting methyl acrylate copolymer has a density of 0.9365 g./cc., a melt index of 1.72, an ultimate tensile strength of 1380 p.s.i., an elongation value of 690 percent, an impact value of 2560 p.s.i., a yield value of 492 p.s.i., an a flexural stiffness value of 3000 lb./sq. in. The methyl acrylate copolymer, together wtih 600 ml. of 17 N aqueous ammonium hydroxide and 1400 ml. of p-xylene are added to a two-liter pressure reactor. The reaction mixture is heated to 225° C. for 16.5 hours with agitation by rocking. A pressure of about 850 p.s.i. is generated during the reaction. The reaction mixture is cooled and the amide polymer product which consists of a white solid is removed. The polymer product is washed with methanol and is ground to provide a finely divided product which is dried.

The amide polymer product has the following properties: 1.5 percent nitrogen; 50.6 percent of the starting ester groups are converted to amide groups; 198 ft. lbs./sq. in. tensile impact; a melt index of 0.2; zero failures of ten flexes at —72° C. (brittleness value) and 13,500 lbs./sq. in. flexural stiffness.

EXAMPLE III

Water, 425 ml., ammonia solution 28%, 1175 ml., and 350 g. of an ethylene methyl methacrylate copolymer, containing 41% by weight methyl methacrylate, and having a melt index of 1,000 were charged to a one gallon autoclave and heated at 260° C. for 6 hours, stirred at 1100 r.p.m. Maximum pressure over the reaction period was 1300 p.s.i. Polymer solids were collected as tiny spheres by vacuum filtration and washed four times by slurrying with deionized water, followed by filtration. The polymer cake was dried at 45° C. and 28 inches of mercury. The polymer product contained about 60% by weight ethylene, about 32% by weight methacrylamide, and about 8% by weight methacrylic acid, and had a melt index of 90.

EXAMPLE IV

Preparation of grafted polycarbonamide

The following procedure illustrates a method for making suitable ethylene-acrylic copolymer-polycarbonamide grafts, employing a copolymer with a variety of polymerized monomer units, including about 2 weight percent acrylamide units.

the amount of material insoluble in cresol and formic acid increasing in each instance as the dose is increased to 20 megarads.

TABLE I.—SOLUBILITY OF IRRADIATED NYLON 6 FILM

| Resin reference | Initiator | Irradiation conditions [a] | | Solubility [b] | |
|---|---|---|---|---|---|
| | | Dose, megarads | Environment | Formic acid | M-cresol |
| Commercial Nylon 6 | | Control [c] | | Soluble | Soluble. |
| | | 5, 10, 15, 20 | Air | do | Do. |
| | | 5, 10, 15, 20 | N₂ | Soluble | Soluble. |
| Copolymer grafted Nylon 6 | 10% ethylene-acrylic copolymer | Control [c] | | do | Do. |
| | | 10, 20 | Air | (d) | Insoluble. |
| | | 5 | | 90-95 | Do. |
| | | 15 | | 70-80 | 60-70. |
| | | 5 | N₂ | Soluble [e] | Soluble.[e] |
| | | 10 | | 60-70 | 50-60. |
| | | 15 | | 50-60 | (d). |

[a] Temperature=72-90° F.
[b] Approximate solubility expressed as percent soluble material.
[c] Film solubility prior to irradiation.
[d] Solubility not determined.
[e] Greater than 95% soluble.

One and one-half parts, by weight, of a copolymer having chemically combined therein, by weight, 81.1 percent ethylene, 9.5 percent sodium acrylate, 6.6 percent acrylic acid, 1.9 percent acrylamide and .9 percent methyl acrylate and 150 parts of ε-caprolactam were mixed in with 1.5 parts of water in a resin kettle, and the mixture was heated slowly to 100-120° C. for 1 hour under a blanket of nitrogen. The temperature was raised to 260-270° C. over one hour and the heating continued for an additional 9 hours. The product was a white, viscous material which was allowed to cool to provide a resilient, hard resin, which was frozen in Dry Ice, crushed and ground in a Wiley mill. The ground resin was then extracted with methanol for 8 hours in a Soxhlet extractor, and a portion of the extracted product was injection molded into test specimens characterized by a Shore D Hardness of 82, an average tensile impact of 109.8 ft. lbs./in.², a tensile yield of 11,568 lbs./sq. in. and break at 12,224 lbs./sq. in., elongation of 85 percent, a flexural stiffness of 306,719 p.s.i. and a melt index at 235° C. of 6.3 gm./10 minutes under a load of 2160 grams.

EXAMPLE V

The polymer product of Example III was substituted for the copolymer of Example IV and was used to prepare a graft copolymer by the method of Example IV with similar results.

Irradiation of grafted nylon

Samples of copolymer-initiated nylon 6 were pressed into film at 450° F. (hydraulic press). The film samples were irradiated with a linear electron accelerator at 72-90° F. in air or nitrogen environment with high energy electrons up to dose levels of 20 megarads. Dose rates used were 43,000 rads per second in air, and 54,000 rads per second in nitrogen atmosphere.

In control experiments, samples of commercial Nylon 6 were pressed into film and were irradiated under identical conditions and to the same dose levels as the polyolefin copolymer-grafted nylons. The samples irradiated, the irradiation conditions and dose levels, and some approximate solubility data for the irradiated samples are summarized in Table I.

Solubility of irradiated nylons

As can be seen from the data in Table I, commercial Nylon 6 does not become insoluble in formic acid or m-cresol at doses up to 20 megarads. Samples of ethylene-copolymer grafted Nylon 6 were rendered partially insoluble at dose levels between 5 and 20 megarads, with Relative solution viscosities of irradiated nylons Relative solution viscosities were determined for those irradiated samples of commercial Nylon 6 and the grafted nylon which appeared to be soluble in formic acid. The data are summarized in Table II.

At a dose of 20 megarads, the relative solution viscosities of the commercial nylon has increased somewhat over that obtained for control samples, but only to an extent normal for Nylon 6 homopolymer. By comparison, the relative solution viscosity of a sample of grafted nylon irradiated to only 5 megarads in nitrogen has shown a significant increase over that shown by the control sample; the sample irradiated to 5 megarads in air was not sufficiently soluble in formic acid to permit determination of the relative solution viscosity with accuracy.

TABLE II.—RELATIVE SOLUTION VISCOSITIES OF IRRADIATED NYLON

| Resin reference | Irradiation dose, megarads | Relative solution viscosity [a] irradiation environment | |
|---|---|---|---|
| | | Air | Nitrogen |
| Commercial Nylon 6 | Control [b] | 2.68 | |
| | 5 | 2.66 | 2.73 |
| | 10 | 2.95 | 2.87 |
| | 15 | 3.17 | 2.92 |
| | 20 | 3.65 | 3.51 |
| Copolymer grafted nylon | Control [b] | 2.82 | |
| | 5 | [c] 3.39 | [d] 4.22 |

[a] Film samples were dried at 100° C. under vacuum prior to analysis.
[b] Relative solution viscosity measured on film sample prior to irradiation.
[c] Significant amount of material insoluble in formic acid.
[d] Very small amount of material insoluble in formic acid.

We claim:
1. Irradiating with ionizing radiation at a dosage of from about 5 to about 20 megarads an article formed from a composition comprising a graft copolymer of (A) from about 1 to about 30 weight percent of a preformed copolymer of ethylene and at least one comonomer said comonomer when polymerized having the structural formula

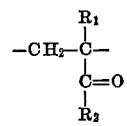

where $R_1$ is —H or —$CH_3$, $R_2$ is —$OR_3$, —OH, —$NH_2$, —$NHR_3$, and $NR_3R_4$ or —OM where M is a metal or —$NH_4$, $R_3$ and $R_4$ are lower alkyl groups, at least 2% by weight of the polymerized monomer units in the copolymer have $R_2$ as —$NH_2$, —$NHR_3$ or —$NR_3R_4$, with (B) from about 99 to about 70 percent of polycarbonamide forming monomers selected from the group consisting of (a) monoaminomonocarboxylic acids or their corresponding lactams (b) mixtures of diamines and dicarboxylic acids, and (c) mixtures of (a) and (b), said preformed copolymer consisting of from about 5 to about 90% by weight of chemically combined ethylene.

2. The method of crosslinking nylon consisting essentially of
preparing a graft copolymer of from about 99 to about 70 weight percent of a nylon grafted on to from about 1 to about 30 weight percent of a preformed copolymer of ethylene copolymerized with a monomer having the structural formula when polymerized

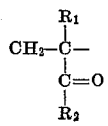

where $R_1$ is —H or —$CH_3$, $R_2$ is —$OR_3$, —OH, —$NH_2$, —$NHR_3$, and $NR_3R_4$ or —OM where M is a metal or —$NH_4$, $R_3$ and $R_4$ are lower alkyl groups, at least 2% by weight of the polymerized monomer units in the copolymer have $R_2$ as —$NH_2$, —$NHR_3$ or —$NR_3R_4$, said preformed polymer consisting of from about 5 to about 90% of chemically combined ethylene,
irradiating said graft copolymer with electrons at a dosage of from about 5 to about 35 megarads.

3. The method of claim 2 wherein the dosage is from about 5 to about 20 megarads.

4. The method of claim 2 wherein the nylon is polycaprolactom.

5. The method of claim 3 wherein the graft copolymer is irradiated at a dose of below 10 megarads.

6. The method of claim 2 wherein the graft copolymer contains from about 2 to about 20% by weight of preformed copolymer.

7. A crosslinked graft copolymer of from about 99 to about 70 weight percent of a nylon grafted on to from about 1 to about 30 weight percent of a preformed copolymer of ethylene copolymerized with a monomer having the structural formula when polymerized

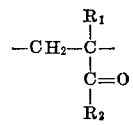

where $R_1$ is —H or —$CH_3$, $R_2$ is —$OR_3$, —OH, —$NH_2$, —$NHR_3$, and $NR_3R_4$ or —OM where M is a metal or —$NH_4$, $R_3$ and $R_4$ are lower alkyl groups, at least 2% by weight of the polymerized monomer units in the copolymer have $R_2$ as —$NH_2$, —$NHR_3$ or $NR_3R_4$, said preformed polymer consisting of from about 5 to about 90% of chemically combined ethylene, and said graft copolymer has been crosslinked by irradiating with electrons at a dosage of from about 5 to about 35 megarads.

8. The copolymer of claim 7 wherein the nylon is polycapraloctam.

9. The copolymer of claim 8 wherein said graft copolymer has been crosslinked at a dosage of below 10 megarads.

10. The copolymer of claim 7 wherein the graft copolymer contains from about 2 to about 20% by weight of preformed copolymer.

11. The copolymer of claim 7 wherein the dosage is from about 5 to about 20 megarads.

References Cited
UNITED STATES PATENTS 3,516,961  6/1970  Robb _____ 260—857
3,375,219  3/1968  Robb _____ 260—41

MURRAY TILLMAN, Primary Examiner

R. B. TURER, Assistant Examiner

U.S. Cl. X.R.

204—159.15, 159.19; 260—857 R, 857 L; 264—230